United States Patent
Agarwal et al.

(10) Patent No.: US 12,509,618 B2
(45) Date of Patent: Dec. 30, 2025

(54) THERMAL INTERFACE MATERIALS

(71) Applicants: Dow Global Technologies LLC, Midland, MI (US); Dow Silicones Corporation, Midland, MI (US)

(72) Inventors: Praveen Agarwal, Lake Jackson, TX (US); William J. Harris, Lake Jackson, TX (US); Chi-Hao Chang, Midland, MI (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 240 days.

(21) Appl. No.: 18/262,771

(22) PCT Filed: May 4, 2022

(86) PCT No.: PCT/US2022/027676
§ 371 (c)(1),
(2) Date: Jul. 25, 2023

(87) PCT Pub. No.: WO2022/235802
PCT Pub. Date: Nov. 10, 2022

(65) Prior Publication Data
US 2024/0400877 A1    Dec. 5, 2024

Related U.S. Application Data

(60) Provisional application No. 63/184,330, filed on May 5, 2021.

(51) Int. Cl.
| | | |
|---|---|---|
| *C09K 5/14* | (2006.01) | |
| *C08G 18/10* | (2006.01) | |
| *C08G 18/12* | (2006.01) | |
| *C08G 18/20* | (2006.01) | |
| *C08G 18/22* | (2006.01) | |
| *C08G 18/32* | (2006.01) | |
| *C08G 18/50* | (2006.01) | |
| *C08G 18/80* | (2006.01) | |
| *C08K 3/08* | (2006.01) | |
| *C08K 5/00* | (2006.01) | |
| *C08K 9/06* | (2006.01) | |
| *C08L 75/04* | (2006.01) | |
| *C09D 7/45* | (2018.01) | |
| *C09D 7/62* | (2018.01) | |
| *C09D 7/65* | (2018.01) | |
| *C09D 175/12* | (2006.01) | |
| *H01M 10/653* | (2014.01) | |
| *H01M 10/6551* | (2014.01) | |

(52) U.S. Cl.
CPC ............... *C09K 5/14* (2013.01); *C08G 18/10* (2013.01); *C08G 18/12* (2013.01); *C08G 18/2027* (2013.01); *C08G 18/2063* (2013.01); *C08G 18/225* (2013.01); *C08G 18/3225* (2013.01); *C08G 18/5024* (2013.01); *C08G 18/8067* (2013.01); *C08K 3/08* (2013.01); *C08K 5/0016* (2013.01); *C08K 9/06* (2013.01); *C08L 75/04* (2013.01); *C09D 7/45* (2018.01); *C09D 7/62* (2018.01); *C09D 7/65* (2018.01); *C09D 175/12* (2013.01); *H01M 10/653* (2015.04); *H01M 10/6551* (2015.04); *C08K 2003/0812* (2013.01); *C08K 2201/001* (2013.01); *C08K 2201/005* (2013.01); *C08L 2205/14* (2013.01); *H01M 2220/20* (2013.01)

(58) Field of Classification Search
None
See application file for complete search history.

(56) References Cited

U.S. PATENT DOCUMENTS 5,053,465 A    10/1991    Waddill

FOREIGN PATENT DOCUMENTS

| WO | 2004084238 | 9/2004 |
|---|---|---|
| WO | 2017044402 | 3/2017 |
| WO | 2019120924 | 6/2019 |
| WO | 2019155327 | 8/2019 |
| WO | 2019189944 | 10/2019 |
| WO | 2020176437 | 9/2020 |
| WO | 2020176612 | 9/2020 |
| WO | 2020236440 | 11/2020 |
| WO | 2022056096 | 3/2022 |

OTHER PUBLICATIONS

Kim, "Cardanol—An Eco-friendly Isocyanate Blocking Agent", 2019.
PCT/US2022/027676 International Search Report and Written Opinion with a mailing date of Aug. 2, 2022.

*Primary Examiner* — Cheng Yuan Huang
(74) *Attorney, Agent, or Firm* — Arthur R. Rogers

(57) ABSTRACT

Thermally conductive compositions include a blocked isocyanate prepolymer composition containing an isocyanate prepolymer blocked with one or more of alkylphenol or alkenylphenol; and an amine composition containing: one or more polyetheramines, and one or more catalysts selected from a group consisting of carboxy late salts, tertiary amines, amidines, guanidines, and diazabicyclo compounds; and a thermally conductive filler present at a percent by weight of the thermally conductive composition (wt %) in a range of 60 wt % to 98 wt %; wherein the thermally conductive composition cures at a temperature in the range of 18° C. to 35° C. when the blocked isocyanate prepolymer composition and the amine composition are mixed. Methods include preparing a thermally conductive gap filler prepared by combining a blocked isocyanate prepolymer composition and an amine composition, and curing the resulting thermally conductive composition, such as at room temperature.

10 Claims, No Drawings

THERMAL INTERFACE MATERIALS

FIELD

The present disclosure relates to thermally conductive compositions for use as a gap filler, adhesive, sealant, or paste in applications requiring thermal management such as electronics and automotive applications, and methods for using same.

INTRODUCTION

Thermal interface materials such as gap fillers, adhesives, and gels are used widely for thermal management in electronics and automotive applications. For example, electric vehicle (EV) batteries are cooled by a cooling plate with a circulating fluid underneath their battery modules. For efficient cooling, good thermal contact between the battery modules and the cooling plate is needed. A gap filler bridges this gap and provides thermal contact between the battery modules and the cooling plate. Thermal gap pads and dispensable gap fillers are two of the primary gap filler technologies. Among the two, dispensable gap fillers have the advantage of providing more efficient heat transfer and less wastage of material compared to thermal pads. It is desired to have a thermal interface material composition with a high thermal conductivity (>0.5 W/m·K), ability to form a cured solid part with no applied heat, low density, and is easily processed.

There are however several key issues with the currently available thermal interface materials. For example, polyurethane (PU) thermal interface formulations based on isocyanate monomer(s), or isocyanate prepolymer(s) with residual isocyanate monomer(s), and/or polymeric isocyanates with residual isocyanate monomers present a concern with the handling of materials containing isocyanates. Some material users even go so far as to enforce a requirement of less than 0.1 wt % free isocyanate monomer(s) (e.g., free Toluene diisocyanate (TDI), Methylene diphenyl diisocyanate (MDI), etc.). These rules regarding the free isocyanate monomer content of PU formulations exist to comply with the European Union regulations (among others).

Other issues with PU-based thermal management products include stabilizing isocyanate functional groups, which can have limited storage stability (i.e., shorter shelf-life as indicated by increases in viscosity) that can be worsened/shortened in the presence of fillers. Low cost, low density, thermally conductive fillers such as aluminum trihydrate are not compatible with the isocyanates due to presence of surface hydroxyl groups that can react with available isocyanate groups, rendering such formulations unstable and unusable.

SUMMARY

In one aspect, thermally conductive compositions include: a blocked isocyanate prepolymer composition containing an isocyanate prepolymer blocked with one or more of alkylphenol or alkenylphenol; and an amine composition containing: one or more polyetheramines, and one or more catalysts selected from a group consisting of carboxylate salts, tertiary amines, amidines, guanidines, and diazabicyclo compounds; and a thermally conductive filler present at a percent by weight of the thermally conductive composition (wt %) in a range of 60 wt % to 98 wt %; wherein the thermally conductive composition cures at a temperature in the range of 18° C. to 35° C. when the blocked isocyanate prepolymer composition and the amine composition are mixed.

In another aspect, methods include preparing a thermally conductive gap filler prepared by combining a blocked isocyanate prepolymer composition and an amine composition and to curing the resulting thermally conductive composition, such as at room temperature.

In another aspect, methods include preparing a thermally conductive composition by combining a blocked isocyanate prepolymer composition and an amine composition; and emplacing the thermally conductive composition between a heat source and a heat sink in an EV battery.

DETAILED DESCRIPTION

Embodiments disclosed herein relate to thermally conductive compositions for use in thermal management applications, including the enhancing heat transmission in batteries, electronic devices, automotive applications, and the like. Thermally conductive compositions are formulated as a two-component mixture, which are combined and applied in situ to cure at room temperature and form a thermally conductive gap filler. In some cases, thermally conductive compositions may be pre-cured and applied as a gap filler pad. The two-component system may include a blocked isocyanate prepolymer composition and an amine composition that are stabilized and exhibit minimal viscosity or squeeze force increase until combined for use. Compositions disclosed herein may also include a dispersion additive in one or more of the system components.

Unless defined otherwise, all technical and scientific terms used herein have the same meaning as commonly understood by one of ordinary skill in the art to which the disclosure belongs. Also, all publications, patent applications, patents, and other references mentioned herein are incorporated by reference.

The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.). Unless stated to the contrary, implicit from the context, or customary in the art, all parts and percentages are based on weight and all test methods are current as of the filing date of this disclosure.

As disclosed herein, the term "composition", "formulation" or "mixture" refers to a physical blend of different components, which is obtained by mixing components in parts by weight by a physical means. The sum of the percentages by weight of each component in a composition is 100 wt %, based on the total weight of the composition.

As used herein, the term "average particle size" refers to the median particle size or diameter of a distribution of particles as determined for example, by a Multisizer 3 Coulter Counter (Beckman Coulter, Inc., Fullerton, CA) according to the procedure recommended by the manufacturer. It is a volume average particle size. The median particle size, $D_{50}$ is defined as the size wherein 50% of the particles in the distribution are smaller than the median particle size and 50 cumulative % of the particles in the distribution are larger than the median particle size. $D_{90}$ is defined as the size wherein 90 cumulative % of the particles in the distribution are smaller than the stated value. $D_{10}$ is defined as the size wherein 10 cumulative % of the particles in the distribution are smaller than the stated value. The average particle size may be estimated based on measuring the surface area according to 8-11 ASTM D4315 or by using sieves of various mesh sizes and calculating the average from the cumulative weight of each size fractions. These alternative methods give estimations of the average particle sizes similar to those determined by the laser diffraction method. Span of the filler particle size distribution is defined as $(D_{90}-D_{10})/D_{50}$, and is an indication of the width of the particle size distribution.

As disclosed herein, "and/or" means "and, or as an alternative". All ranges include endpoints unless otherwise indicated.

As disclosed herein, "room temperature" means a temperature range from 18° C. to 35° C.

As disclosed herein, "cures" and "cured" means increase in the viscosity or squeeze force after mixing with eventual hardening of the material and formation of a solid part resulting from crosslinking of polymer chains.

As disclosed herein, "molecular weight" means number average molecular weight.

As disclosed herein, "thermally conductive filler" means a thermal conductivity value greater than 1 W/m·K as measured by ISO 22007-2 using hot disc.

As disclosed herein, "thermally conductive composition" (which includes both cured and uncured compositions) means a composition having a thermal conductivity value greater than 0.5 W/m·K as measured by ISO 22007-2 using hot disc.

As disclosed herein, "squeeze force" refers to resistance of a thermally conductive composition or component to compression, as measured in Newtons. Squeeze force is measured using a TA.XTplus texture analyzer equipped with a 50 kg load cell. After dispensing the respective sample onto a flat aluminum substrate, an acrylic probe with a diameter of 40 mm is lowered to sandwich the test material against the flat substrate to achieve a standard 5.0 mm gap thickness. Any excess overflow material was trimmed away with a flat-edge spatula. After trimming, the test started and the probe moved to a final thickness of 0.3 mm, at a rate of 1.0 mm/see while the force was recorded. The specific force value recorded at the gap of 0.5 mm is reported as the "squeeze force".

Viscosity can be measured using methods commonly known in the art using TA instruments ARES-G2, AR2000 type rheometers or Anton Paar MCR rheometers using parallel plate fixtures.

Embodiments relate to thermally conductive compositions for use in thermal management applications, including the enhancing heat transmission in electronic devices, batteries, automotive applications, and the like. Described compositions can be used as a thermally conductive gap filler or a pre-cured thermal pad for applications requiring thermal management, such as electric vehicle batteries.

Thermally conductive compositions disclosed herein generally include the product obtained from combining a two-component curable composition: a blocked isocyanate prepolymer composition ("A-side") and an amine composition ("B-side"). During application, the A-side and B-side are mixed, initiating a curing reaction between the blocked isocyanate prepolymer and amine functional groups at room temperature, and forming the thermally conductive composition. Thermally conductive compositions may also include one or more thermally conductive fillers in the A-side and the B-side to enhance thermal transport properties.

The blocked isocyanate prepolymer composition includes an isocyanate prepolymer that is reacted with a blocking agent to limit the presence of free isocyanate (e.g., below a concentration of 0.1 wt %) and minimize premature gelation and crosslinking of the prepolymer. Reducing the free isocyanate concentration also improves storage, safety, and handling properties. In addition to the safety benefits, blocking the isocyanate functional groups of the prepolymer also increases the compatibility of the blocked isocyanate prepolymer composition with fillers, including thermally conductive fillers. In some cases, fillers may be added to the A-side and/or the B-side of the thermally conductive composition at a percent by weight (wt %) of up to 60 wt % or more. Thermally conductive compositions disclosed herein are also compatible with low density and low-cost fillers such as aluminum trihydrate.

Thermally conductive compositions can be prepared by mixing a blocked isocyanate prepolymer composition and an amine composition at room temperature to produce a cured solid at room temperature. Room temperature curing represents an improvement over typical blocked isocyanate formulations, which are often cured at temperatures at 80° C. or above. The ability to produce cured thermally conductive compositions at room temperature increases the applicability of the materials to heat sensitive applications such as electric vehicle batteries and offers the additional advantage of reduced energy consumption during fabrication.

The present disclosure is also directed to methods of making and using the thermally conductive composition. Thermally conductive compositions may be prepared by combining a blocked isocyanate prepolymer composition and an amine composition, wherein at least one of the blocked isocyanate prepolymer composition or the amine composition includes a thermally conductive filler. Fillers and thermally conductive fillers may also be treated to increase surface hydrophobicity and storage stability, while also reducing premature viscosity buildup. Thermally conductive compositions may also include one or more additives that reduce the viscosity or squeeze force of the thermally conductive composition, such as a dispersion additive or plasticizer. Reducing the viscosity and squeeze force of the components of the thermally conductive composition may be beneficial, for example, by reducing the force required to assemble a gap filler between a heat source and a heat sink, such as in an EV battery application. Reduced force in the system reduces the likelihood of damaging the batter module components, and increasing reproducibility and safety. Particularly, the use of blocked isocyanate prepolymer compositions reduce concerns of free isocyanate monomer or volatile silicones, while maintaining high thermal conductivity.

Blocked isocyanate prepolymer compositions described here may be blocked with one or more blocking agents, including alkylphenol and/or alkenylphenol blocking agents. The blocked isocyanate prepolymer composition and/or the amine composition may also contain one or more functional additives, including moisture scavengers, plasticizers, adhesion promoters, thixotropic agents, catalysts, color agents, antioxidants, wetting agents, filler treatment agents, surface treatment additives, or a combination thereof. A catalyst may also be mixed into the B-side of the two-component curable composition. Two-component curable compositions disclosed herein may be cured to form a thermally conductive gap filler or a gap pad in some embodiments.

A.) Blocked Isocyanate Prepolymer Composition

The blocked isocyanate prepolymer composition (or A-side) may contain of one or more blocked isocyanate prepolymers, one or more thermally conductive fillers, and other optional additives. Blocked isocyanate prepolymer compositions may include a blocked isocyanate prepolymer at a percent by weight (wt %) of 1 wt % to 40 wt %, 1 wt % to 20 wt %, or 1 wt % to 15 wt %. Blocked isocyanate prepolymer compositions may include a thermally conductive filler present at a percent by weight (wt %) of 40 wt % to 99 wt %, 50 wt % to 98 wt %, 60 wt % to 97 wt %, 75 wt % to 95 wt %, or 80 wt % to 94 wt %.

Blocked Isocyanate Prepolymer

The blocked isocyanate prepolymer composition may include a blocked isocyanate prepolymer product generated by reacting an isocyanate terminated prepolymer (including any residual monomeric diisocyanate) and one or more blocking agents. In some cases, reacting the isocyanate groups with a blocking agent will reduce the free isocyanate content in the prepolymer to less than 0.1 wt %, less than 0.01 wt %, less than 0.001 wt %, or equal to zero wt %.

Isocyanate terminated prepolymers may be any prepolymer(s) prepared by the reaction of one or more polyols with a stoichiometric excess of one or more polyisocyanate. "Polyisocyanate" refers to any compound that contains two or more isocyanate groups. The polyisocyanate may include a monomeric polyisocyanate, a polymeric isocyanate, an isocyanate prepolymer, or mixtures thereof. The polyisocyanates may be aromatic, aliphatic, araliphatic or cycloaliphatic polyisocyanates, or mixtures thereof. Preferred polyisocyanates include aromatic polyisocyanates. An aromatic polyisocyanate refers to a compound having two or more isocyanates group bonded to aromatic carbon atoms. Suitable polyisocyanates may have an average isocyanate functionality of 1.9 or more, 2.0 or more, 2.1 or more, 2.2 or more, or 2.3 or more, and at the same time, 4.0 or less, 3.8 or less, 3.5 or less, 3.2 or less, 3.0 or less, 2.8 or less, or 2.7 or less. Examples of suitable monomeric polyisocyanates include toluene diisocyanate (TDI), diphenylmethane diisocyanate (MDI), isophorone diisocyanate (IPDI), hexamethylene diisocyanate (HDI), tetramethylene-1,4-diisocyanate, cyclohexane-1,4-diisocyanate, hexahydrotolylene diisocyanate, 1-methoxyphenyl-2,4-diisocyanate, diphenylmethane-4,4'-diisocyanate, diphenylmethane-2,4'-diisocyanate, 4,4'-biphenylene diisocyanate, 3,3'-dimethoxy-4,4'-diphenyl diisocyanate, and 3,3'-dimethyldiphenylpropane-4,4'-diisocyanate; isomers thereof, or mixtures thereof. A preferred monomeric diisocyanate is TDI.

The isocyanate terminated prepolymer may include a polyether backbone and isocyanate moieties. The isocyanate-terminated prepolymer may have an isocyanate content by weight based on the weight of the isocyanate-terminated prepolymer of 1% or more, 2.7% or more, 5% or more, 6% or more, 8% or more, or 10% or more, and at the same time, 30% or less, 25% or less, 20% or less, or 15% or less. The isocyanate content herein is measured according to ASTM D5155-19. The isocyanates used to prepare the isocyanate terminated prepolymers can include the above stated monomeric polyisocyanates, isomers thereof, polymeric derivatives thereof, or mixtures thereof. Preferred isocyanates are Toluene diisocyanate (TDI), polymeric derivatives thereof, or mixtures thereof.

TDI used to prepare the isocyanate terminated prepolymer may be 2,4-isomer and the 2,6-isomer of toluene diisocyanate among others. Toluene diisocyanate based prepolymers are desirable as they generally result in lower deblocking temperatures along with ease of deblocking and reaction. A mixture of two or more organic polyisocyanates may also be used.

The polyols used to prepare the isocyanate terminated prepolymer may be any polyol known in the art, including, for example, ethylene glycol, 1,2-propanediol, 1,3-propanediol, 1,3-butanediol, 1,4-butanediol, 1,4-butynediol, 1,5-pentanediol, neopentyl-glycol, bis(hydroxymethyl) cyclohexanes such as 1,4-bis(hydroxymethyl)cyclohexane, 2-methylpropane-1,3-diol, methylpentanediols, diethylene glycol, triethylene glycol, tetraethylene glycol, polyethylene glycol, dipropylene glycol, polypropylene glycol, dibutylene glycol, polybutylene glycols, polyoxyethylene glycols, polyoxypropylene glycols, polyoxypropylene-polyoxyethylene glycols, or mixtures thereof.

Suitable polyols may include polyether polyols prepared by adding an alkylene oxide, such as ethylene oxide (EO), propylene oxide (PO), butylene oxide (BO), or a combination thereof, to an initiator having from 2 to 8 active hydrogen atoms (e.g., such that the initiator includes hydroxyl groups and excludes amines). For example, polyether polyols for polymer formulation may include those having a number average molecular weight (Dalton (Da) or g/mol) from 100 to 10000 Da (e.g., 1000 Da to 8000 Da, 2000 Da to 6000 Da, 3,000 Da to 5000 Da, 3500 Da to 4500 Da, etc.). The polyether polyols may have a functionality of active hydrogen atoms per molecule that include from 2 to 8, of at least 2, at least 3, up to 8, or up to 6. The polyether polyols used for prepolymer formation may have a hydroxyl number from 10 to 200 mg KOH/g (e.g., 30 to 60 mg KOH/g, etc.). The one or more polyether polyols may include a polyoxypropylene containing polyol such as an ethylene oxide capped polyoxypropylene diol or triol and/or polyoxypropylene diol or triol. Exemplary polyether polyols are available from the Dow Chemical Company under the trade name VORANOL™. In some embodiments, the functionality of polyol is from 1.9 to 3.1 and the number average molecular weight is from 500 to 10000 Da.

The production of polyols by alkoxylation of an initiator may be done by procedures known in the art. For example, a polyol may be made by the addition of an alkylene oxide (EO, PO, or BO), or a combination of alkylene oxides to the initiator by anionic or cationic reaction or use of double metal cyanide (DMC) catalyst. For some applications only one alkylene oxide monomer may be used, for some other applications a blend of monomers may be used, and in some cases a sequential addition of monomers (such as PO followed by an EO feed or EO followed by PO) may be used.

If a copolymer, a polyether polyol may be a block and/or random copolymer as well as a capped copolymer. Other useful polyols include polyester polyols, hydroxyl-terminated poly(butadiene) polyols, polyacrylate polyols and amine-initiated polyols. Exemplary polyols having an amine initiator (and may optionally be self-catalytically active) are available from the Dow Chemical Company under the trade name VORANOLT and VORACTIVE™ polyols.

The isocyanate terminated prepolymer may be prepared by standard procedures known to a person skilled in the art, disclosed in, e.g., U.S. Pat. Nos. 4,294,951; 4,555,562; and 4,182,825; and International Publication No. WO 2004/074343. The reactants may be mixed and heated to promote reaction of the polyols and the polyisocyanate. The reaction temperature will be within the range from 30° C. to 150° C. (e.g., from 60° C. to 100° C.). The reaction may be performed in a moisture-free atmosphere. An inert gas such as nitrogen and/or argon may be used to blanket the reaction mixture. If desired, an inert solvent can be used during preparation of the isocyanate terminated prepolymer, although the inert solvent may be excluded. A catalyst to promote the formation of urethane bonds may also be used. For producing the blocked isocyanate prepolymers, the blocking agent may be added during the formation of the isocyanate prepolymer, after the formation of the isocyanate prepolymer, or to the polyisocyanate prior to the polyisocyanate(s) introduction to the polyol(s). Catalysts may be used in small amounts, e.g., each catalyst being employed from 0.0015 wt % to 5 wt % of the total weight of the blocked prepolymer for forming the blocked isocyanate prepolymer. The amount depends on the catalyst or mixture of catalysts and the reactivity of the polyols and isocyanate as well as other factors familiar to those skilled in the art.

Isocyanate prepolymers and/or blocked isocyanate prepolymers may be formed using a catalyst in some embodiments, which may include amine-based catalysts and/or tin-based catalysts. Exemplary catalysts include tertiary amine catalysts and organotin catalysts. Examples of commercially available include: trimethylamine, triethylamine, N-methylmorpholine, N-ethylmorpholine, N,N-dimethylbenzylamine, N,N-dimethylethanolamine, N,N-dimethylaminoethyl, N,N,N',N'-tetramethyl-1,4-butanediamine, N,N-dimethylpiperazine, 1,4-diazobicyclo-2,2,2-octane, bis(dimethylaminoethyl) ether, triethylenediamine, dibutyl tin dilaurate, triethylenediamine, and dimethylalkylamines where the alkyl group contains from 4 to 18 carbon atoms. Mixtures of various catalysts may be used.

The blocked isocyanate prepolymer, in some embodiments, may be formed by mixing and reacting one or more of the isocyanate functionalities on an isocyanate prepolymer with one or more blocking agents. Blocking agents for reaction with the isocyanate terminated prepolymer may include monophenolics (e.g., a single hydroxyl group [HO-] bonded directly to an aromatic ring or aromatic rings); substituted monophenolics with at least one substituent atom or group other than a hydrogen or a hydroxyl on aromatic ring(s); substituted monophenolics with at least one hydrocarbyl substituent on aromatic ring(s); alkyl phenols such as nonylphenol; or alkenyl phenols such as cardanol. Blocking agents may include cardanol-based blocking agents such as cashew nutshell liquid (CNSL) that is a by-product of cashew nut processing (e.g., may be extracted from a layer between a nut and a shell of a cashew nut). In some cases, the CNSL may have a cardanol content of at least 85 wt %, based on a total weight of the CNSL, such that the CNSL includes cardanol as a primary component and may additionally include cardol, methylcardol, and/or anacardic acid as secondary components. The CNSL may be subjected to a heating process (e.g., at the time of extraction from the cashew nut), a decarboxylation process, and/or a distillation process. The CNSL includes cardanol at a percent by weight based on a total weight of the CNSL (wt %) of at least 85 wt % (e.g., 85 wt % to 100 wt %, 90 wt % to 99 wt %, 91 wt % to 98 wt %, 92 wt % to 98 wt %, 93 wt % to 98 wt %, etc.). The CNSL may include less than 8.5 wt % (e.g., from 0.5 wt % to 8 wt %, from 0.5 wt % to 5 wt %, 0.5 wt % to 3 wt %, etc.) of cardanol, with a remainder based on a total of 100 wt % being methylcardanol and/or anacardic acid. The decarboxylated CNSL may be prepared in some cases by at least one distillation process. The blocking agent may be used in an amount such that the equivalents of the groups of the blocking agent are in excess of the amount of isocyanate groups to be blocked. The blocking agent may be used in an amount such that the equivalents of the groups of the blocking agent correspond to the amount of isocyanate groups to be blocked. For example, the blocking agent may be added at a mole percent (mol %) of the isocyanate groups to be blocked of at least 100 mol %, at least 110 mol %, at least 120 mol %, at least 150 mol %, or at least 200 mol %. In some cases, application of an excess of blocking agent may obtain an essentially complete reaction of all isocyanate groups. In some embodiments, the excess blocking agent may be added at a mole percent (mol %) of the isocyanate groups to be blocked of not be more than 20 mol %, not more than 15 mol %, not more than 10 mol %, or not more than 5 mol %. For example, the amount of blocking agent groups used for isocyanate blocking may be from 100 mol % to 110 mol %, based on the amount of the isocyanate groups of the prepolymer that are to be blocked.

The blocking agent may be present at a percent by weight (wt %) of the blocked prepolymer of at least 1 wt %, 3 wt %, 5 wt %, 7 wt %, 9 wt %, 10 wt %, 12 wt %, and/or 13 wt %. In some embodiments, the blocking agent may be present at a percent by weight (wt %) of the blocked prepolymer of up to 14 wt %, 20 wt %, 30 wt %, 40 wt %, 50 wt %, 60 wt %, or 70 wt %. In some embodiments, the blocking agent may be present at a percent by weight (wt %) of the blocked prepolymer from 1 wt % to 70 wt %, from 5 wt % to 60 wt %, 7 wt % to 50 wt %, or from 10 wt % to 50 wt %.

In some embodiments, the blocked isocyanate prepolymer is made from TDI using an all PO polyol of number average equivalent weight of 500 to 2500 Da and functionality 1.9 to 3.1, with 2 to 15% NCO before blocking with a blocking agent such as cardanol. Blocked isocyanate prepolymers disclosed herein may also include commercially available blocked isocyanate prepolymers.

B.) Amine Composition

The amine composition (or B-side) may contain of one or more amines, one or more thermally conductive fillers, and other additives. The amine compositions may include a combination of monoamines, diamines, and higher order amines (e.g., triamines, tetramines, etc.). Selection of the type and number of amine functionalities may be used in some embodiment to adjust the cure profile and hardness of the final product. For example, selection of an amine or polyamine containing one or more primary amines having higher reactivity may be used to increase cure speed and overall hardness of the thermally conductive composition.

In some embodiments, the amine composition may include at least one amine present at a percent by weight of the amine composition (wt %) from 0.2 wt % to 40 wt %, 0.5 wt % to 30 wt %, or 1 wt % to 15 wt %. Amine compositions may include a thermally conductive filler present at a percent by weight (wt %) of 40 wt % to 98 wt %, 50 wt % to 98 wt %, 60 wt % to 98 wt %, 75 wt % to 98 wt %, or 80 wt % to 98 wt %.

The amine composition may include one or more secondary or primary amines, including mixtures thereof. Suitable amines may include dicyclohexylamine (DCHA), cyclohexylamine (CHA), ethylene diamine (EDA), isophorone diamine (IPDA), trisaminopropylamine, LAROMINE™, and JEFFAMINE™ polyetheramines. In one embodiment, amine is an aliphatic amine. In one embodiment, the amine composition may include a polyamine having at least two amine groups, which may independently be primary or secondary amines. In another embodiment, the polyamine may contain at least three amine groups, which may independently be primary or secondary amines. In yet another embodiment, the polyamine may contain six or less amine groups, which may independently be primary or secondary amines. Amine(s) in the amine compositions disclosed herein may have an average primary and/or secondary amine functionality of at least 1.5, at least 2.0, or at least 3.0. The amine composition may also contain amines having an average primary and/or secondary amine functionality of no greater than 6.0. Amine compositions may contain one or more amines present as a liquid in some embodiments.

Other moieties associated with amine functionality may also be utilized. For example, polyetheramines (amine-terminated polyether polyols), including primary and secondary amine-terminated polyether polyols of greater than 500 Da number average molecular weight having from 2 to 6 amine functionalities, preferably from 2 to 3, and an amine equivalent weight of from 100 Da to 7000 Da, from 100 Da to 3000 Da, and 100 Da to 2500 Da may be utilized. Mixtures may also be used. In some embodiments, amine compositions may include one or more polyetheramines having a number average molecular weight from 300 Da to 7000 Da and an average functionality of greater than 2 and less than 3.5. These materials may be made by various methods known in the art.

The polyetheramine useful in this disclosure, for example, include resins made from an appropriate initiator to which lower alkylene oxides, such as ethylene oxide, propylene oxide, butylene oxide or mixtures thereof are added, with the resulting hydroxyl-terminated polyol then being aminated. When two or more oxides are used, they may be present as random mixtures or as blocks of one or the other polyether. In the amination step, the terminal hydroxyl groups in the polyol may be essentially all secondary hydroxyl groups for ease of amination. In some cases, amine-terminated polyether resins useful in this disclosure may have greater than 50 percent of their active hydrogens in the form of amine hydrogens. If ethylene oxide is used, the hydroxyl-terminated polyol may be capped with a small amount of higher alkylene oxide to increase the number of terminal hydroxyl groups that are secondary hydroxyl groups. The polyols so prepared are then reductively aminated by known techniques, for example, as described in U.S. Pat. No. 3,654,370, the disclosure of which is incorporated herein by reference.

In the practice, an amine composition may include one or more high molecular weight polyetheramines, including mixtures of di- and trifunctional materials and/or different molecular weight or different chemical composition materials. In some embodiments, the amine composition is a primary amine. The term "high molecular weight" is intended to include polyether amines having a molecular weight of in the range of 300 Da to 7000 Da. Amine compositions may include one or more polyether amines such as the primary aliphatic JEFFAMINE™ series of polyether amines available from Huntsman Corporation; including JEFFAMINE™ T-403, JEFFAMINE™ T-3000 and JEFFAMINE™ T-5000; or available from BASF including BAXXODUR™ EC 3003, and BAXXODUR™ EC 311.

Thermally Conductive Fillers

Thermally conductive compositions may also include one or more thermally conductive fillers in the A-side and/or the B-side compositions as needed. Fillers disclosed herein may have a thermal conductivity of at least 1 W/m·K, at least 5 W/m·K, or at least 20 W/m·K. In some embodiments, fillers disclosed herein may have a thermal conductivity of less than 1000 W/m·K, or less than 100 W/m·K. Fillers disclosed herein may have low density to reduce overall weight of the composition and reduce weight in automotive, EV, and other application areas. In one embodiment, the filler density is <6 gm/cc, <4 gm/cc, or <2.5 gm/cc. Fillers disclosed herein may also have a filler density of >0.5 gm/cc. Filler hardness is also a factor in reducing equipment wear and tear during the processing of the material. In some embodiments, the filler has a Mohs hardness of <9.5, <5.5, <4, or equal to or greater than 1.

Thermally conductive fillers disclosed herein may include one or more of metal oxides, metal nitrides, metal carbides, metal hydroxides, metal carbonates, metal sulfates, natural and synthetic minerals mainly silicates, and aluminum silicates. Examples of fillers include quartz, fused silica, natural silica, synthetic silica, natural aluminum oxide, synthetic aluminum oxide, aluminum trihydrate (ATH), hollow fillers, beryllium oxide, magnesium oxide, magnesium hydroxide, aluminum hydroxide oxide, boron nitride, aluminum nitride, silicon nitride, silicon carbide, mica, zinc oxide, aluminum nitride, tungsten carbide, mullite, wollastonite, talcum, glimmer, kaolin, bentonite, xonolite, andalusite, zeolite, dolomite, glass powder/fibers/fabrics, other organic or inorganic particulate filler. Examples of fillers also include barium titanate, carbon fibers, diamond, graphite, onyx, and a combination thereof. Thermally conductive compositions may include one or more fillers such as, and mixtures thereof which are either added into the formulation in their end state or formed in-situ. In some cases, the filler may be thermally conductive and electrically insulating as defined by dielectric strength of greater than 10 kV/mm. Thermally conductive fillers are known in the art and commercially available, see for example, U.S. Pat. No. 6,169,142.

Fillers disclosed herein may have a morphology that includes shapes such as platelets, fibers, spheres, granules, needles, which may be crystalline, semi-crystalline or amorphous, or any combination thereof. The particles may be spherical, nearly spherical, semi-spherical, or irregular in shape so long as the aspect ratio is no more than 3 as determined by electron micrograph.

The thermally conductive fillers of the present disclosure can be modified with a treating agent before incorporation in the A-side and/or B-side of a thermally conductive composition. In some cases, modification of a thermally conductive filler prior to addition to an A-side or B-side component can reduce increases in viscosity or squeeze force of the components, in addition to improving storage stability and handling. For example, addition of a treatment agent to the B-side results in undesirable changes in rheology of the composition, which can result in undesired increase in the viscosity/squeeze force of the composition.

Treating agents disclosed herein may be used to alter the hydrophobicity/hydrophilicity of the surface of a thermally conductive filler, improving filler and polymer interaction, and modify the viscosity and squeeze force of the resulting thermally conductive composition. For example, a filler may be reacted with a treating agent such as silane (a process also called silanization), which may increase the compatibility of the filler with the blocked isocyanate and/or amine compositions. Treatment agents may include fatty acids, silane treating agents, titanates, zirconates, aluminates, or silazane compounds. In some embodiments, silane treating agents may contain at least one alkoxy group to facilitate surface treatment and/or chemical bonding to the filler. Silane treating agents may also include another group including for example alkyl, hydroxyl, vinyl, allyl, hydrosilyl (i.e., SiH), or other functionalities that can react with the formulation or be compatible or miscible with the formulation. Silane treating agents may have a chemical structure of $Si(OR)_n(R')_{4-n}$, where n is an integer from 1 to 3, R is independently a C1 to C3 alkyl group, and R' is independently an alkyl group from C1 to C20 with at least one R' being chosen from C5 to C20. In some embodiments, silane treating agents may include C5 to C20 alkylsilanes, such as hexadecyltrimethoxysilane.

Treating agents may be applied to the filler as a pretreatment prior to introduction into the A-side and/or B-side, or provided to the A-side with an untreated thermally conductive filler. The concentration may vary depending on the nature of the treating agent and the thermally conductive filler type. Treating agents disclosed herein may be added to a filler at a percent by weight of the filler (wt %) of 0.5 wt % to 10 wt %, 0.5 wt % to 7.5 wt %, or 0.5 wt % to 5 wt %. In some embodiments, treating agent is added only to the A-side of the composition. In some embodiments, the filler is pre-treated prior to addition to the A-side or the B-side.

Filler loadings useful in the thermally conductive compositions of the present disclosure may vary. Thermally conductive filler disclosed herein may be present at a percent by weight of the total weight of the thermally conductive composition (wt %) of 40 wt % to 98 wt %, 50 wt % to 98 wt %, 60 wt % to 98 wt %, 75 wt % to 98 wt %, or 80 wt % to 98 wt %. The filler may be loaded in the A-side and/or B-side in equal or differing amounts that, when combined, result in a thermally conductive composition having a filler concentration within any of the above ranges. It should be noted different filler sizes/types could be blended to obtain the desired filler loading and viscosity of a formulation.

Thermally conductive filler disclosed herein may have a broad particle size distribution and/or have a bimodal particle size distribution. The thermally conductive filler may have an average particle size ($D_{50}$) and breadth sufficient to promote a balance of acceptable processing viscosity prior to cure and to promote a balance of acceptable thermomechanical properties after cure. The average $D_{50}$ particle size for fillers disclosed herein may be in the range of from 0.05 μm to 500 μm, from 0.1 μm to 300 μm, from 0.5 μm to 100 μm, or from 0.5 μm to 50 μm. The average Doo particle size for fillers disclosed herein may be in the range of from 0.05 μm to 500 μm, 1 μm to 300 μm, 5 μm to 100 μm, or 10 μm to 90 μm. The average $D_{10}$ particle size for fillers disclosed herein may be in the range of from 0.05 μm to 30 μm, 0.1 μm to 10 μm, 0.1 μm to 10 μm. The span may be controlled in some cases to reduce the squeeze force of the resulting thermally conductive composition.

Filler disclosed herein may have a broad particle size characterized by span of greater than 2, greater than 3, or greater than 4, or less than 50. In some cases, thermally conductive fillers may have a bimodal particle size distribution produced by blending two fillers with one filler having $D_{50}$ in the range of 0.1 to 20 μm and another filler having $D_{50}$ in the range of 10 to 200 μm.

Preferred filler is aluminum trihydrate due to its low density and low hardness. Preferred filler has a span >4. $D_{10}$ in the range of 0.1 to 10 microns, $D_{50}$ in the range of 5 to 50 microns and Doo in the range of 50 to 200 microns. In one embodiment, filler is pre-treated with a C5-C20 silane treating agent.

Catalysts

Thermally conductive compositions may include one or more catalysts mixed into at least one of the blocked isocyanate prepolymer composition or the amine composition to promote the reaction of blocked isocyanate functional groups with the amine groups. The catalysts may be any one or any combination/mixture of more than one selected from carboxylate salts, tertiary amines, amidines, guanidines, and diazabicyclo compounds. In some embodiments the carboxylate salt is a metal carboxylate; in a further embodiment the carboxylate salt in a metal alkanoate; in a further embodiment the carboxylate salt is an alkali metal carboxylate; and in a further embodiment the carboxylate salt is an alkali metal alkanoate. Examples of suitable metal alkanoates include bismuth octoate, bismuth neodecanoate, potassium acetate, potassium 2-ethylhexanoate, or mixtures thereof. In some embodiments, the tertiary amine is a sterically hindered tertiary amine; a long chain tertiary amine (i.e., amine substituents of at least 6 hydrocarbons); or a cyclic tertiary amine. Examples of suitable tertiary amines include dimorpholinodialkyl ether, a di((dialkylmorpholino)alkyl)ether such as (di-(2-(3,5-dimethyl-morpholino)ethyl)ether), triethylene diamine, N,N-dimethylcyclohexylamine, N,N-dimethyl piperazine, 4-methoxyethyl morpholine, N-methylmorpholine, N-ethyl morpholine, or mixtures thereof. In some embodiments, the amidine or guanidine are N-hydrocarbyl substituted amidines or guanidines; in a further embodiment the amidine or guanidine are cyclic amidines or cyclic guanidines. Examples of suitable amidines or guanidines include 1,8-diazabicyclo[5.4.0] undec-7-ene (DBU), 1,5,7-triazabicyclo[4.4.0]dec-5-ene, diazabicyclo[5.4.0] undec-7-ene, and N-methyl-1,5,7-triazabicyclododecene. The catalyst may be present in an amount of from 0.001% to 5.0%, from 0.01% to 2.0%, or from 0.02% to 0.5%, by weight based on the total weight of the two-component curable composition.

Additives

Thermally conductive compositions may include one or more additives that can include moisture scavengers (e.g., zeolites, molecular sieves, p-toluene sulfonylisocyanate), adhesion promoters, thixotropic agents, color agents such as dyes or pigments, antioxidants, wetting agents such as surfactants, filler dispersion agents, thickening agents, compatibilizers, anti-settling agents anti-syneresis agents, flame retardants, and/or filler treatment agents. Additional optional additives include, but are not limited to, thermostabilizing agents, paraffins, fatty alcohols, dimethylpolysiloxanes, chain extenders, rheology modifiers and thickening agents such as fumed silica AEROSIL R202 or AEROSIL R805 (EVONIK), stabilizers against ageing and weathering, plasticizers, antibacterial agents, fungistatic and bacteriostatic substances. In an example, additives may include a molecular sieve powder such as a zeolite (e.g., SYLOSIV from W. R. Grace), which may be a crystalline aluminosilicate. Molecular sieves may be added at a percent by weight of the total composition (wt %) of 0.1 wt % to 2 wt %.

Thermally conductive compositions may include a plasticizer mixed into at least one of the blocked isocyanate prepolymer composition or the amine composition at a percent by weight of the respective composition (wt %) in an amount ranging from 1 wt % to 20 wt %, 2 wt % to 16 wt %, or 4 wt % to 15 wt %. Plasticizers may be common plasticizers useful in polyurethane and well known to those skilled in the art. The plasticizer may be present in an amount sufficient to disperse or reduce the viscosity of at least one of the blocked isocyanate prepolymer composition or the amine composition. Suitable plasticizers may include soybean oil, phthalates, 2,2,4-trimethyl-1,3-pentanediol diisobutyrate (TXIB), terephthalates, and the like. Other plasticizers may include alkyl phthalates, such as diisononyl phthalates, dioctylphthalate and dibutylphthalate, partially hydrogenated terpenes such as commercially available as "HB-40", epoxy plasticizers, chloroparaffins, and alkyl naphthalenes.

Thermally conductive compositions may include a dispersion additive in the B-side that stabilizes the filler and other components. Dispersion additives function to stabilize the particle via either steric, electrosteric, or electrostatic means and can be non-ionic, anionic, cationic, or zwitterionic. Structures can be linear polymers and copolymers, head-tail type modified polymers and copolymers. AB-block copolymers. ABA block copolymers, branched block copolymers, gradient copolymers, branched gradient copolymers, hyperbranched polymers and copolymers including hyperbranched polyesters and copolymers, star polymers and copolymers. BASF, Lubrizol, RT Vanderbilt, and BYK are all common manufacturers of dispersants. Trade names include: Lubrizol Solsperse series, Vanderbilt Darvan series, BASF Dispex series BYK DisperByk series, BYK LP-C 2XXXX series. Grades can include BYK DisperByk 162, 181, 182, 190, 193, 2200, and 2152; LP-C 22091, 22092, 22116, 22118, 22120, 22121, 22124, 22125, 22126, 22131, 22134, 22136, 22141, 22146, 22147, 22435; LP-N 22269; Solsperse 3000, and Darvan C-N.

In some embodiments, the dispersion additive is a hyperbranched polyester containing amine groups sterically protected by polyester side chains. Dispersion additives disclosed herein may be present in amount of 0.01 wt % to 2 wt %, 0.1 wt % to 1 wt %, or 0.1 wt % to 0.5 wt % in B-side of the composition.

C. Method of Preparation

Prior to combination to form a thermally conductive composition, the blocked isocyanate prepolymer composition and/or the amine composition may have a squeeze force of 250 N or less, 150 N or less, or 85 N or less. The blocked isocyanate prepolymer composition and/or the amine composition may have a squeeze force in the range of 35 N to 250 N, 35 N to 150 N, or 35 N to 85 N. In some embodiments, the blocked isocyanate prepolymer composition and the amine composition may exhibit a viscosity change of <50% over 3 days, or <20% after heating at 60° C. over 7 days.

Preparation of the thermally conductive compositions of the present disclosure may be achieved by mixing the respective components of the blocked isocyanate prepolymer composition and the amine composition, and to combine the components to prepare the final mixture. Suitable mixing techniques include the use of a Ross PD Mixer (Charles Ross), Myers mixer, FlackTek Speedmixer, or other mixers known in the art that distributes the different components evenly. The respective formulation components and compositions can generally be added in any sequence, various combinations, and various times of additions as is convenient and desired. Any of the above-mentioned optional assorted additives may also be added during the mixing to form the thermally conductive composition, or prior to the mixing (e.g., added to the blocked isocyanate and/or amine compositions). One or more of the components of the formulation may also be premixed.

Various components of the composition could also be mixed using a continuous process such as twin-screw extrusion. Various streams could be fed separately to an extruder or premixed in various combinations to form the blocked isocyanate composition and the amine composition. Such a process could be suitable for large volume manufacturing.

The present disclosure also provides a process for preparing a thermally conductive composition, including mixing the amine composition with the blocked isocyanate prepolymer composition, and optional components described above. The amine composition and the blocked isocyanate prepolymer composition can be combined such that the molar ratio of blocked isocyanate groups to amine reactive groups is in the ranges of 0.90:1.1 to 1.1:0.9, such as 0.90:1.1, 0.95:1.05, 0.97:1.03, or 1:1. At the same time, the volume ratio of the amine composition to the blocked isocyanate prepolymer composition in the curable composition may be controlled within the range between 0.90:1.1 from 0.95:1.05, from 0.97:1.03, or at the ratio of 1:1. Such volume ratios (that is, consistent mixing ratios) indicate the two-component curable composition can be prepared using existing processing facilities for conventional two-component polyurethane-based compositions.

The two main components of the thermally conductive composition (i.e., the amine composition and the blocked isocyanate prepolymer composition) are reactive with one another and when contacted or mixed upon application, undergo a curing reaction wherein the reaction product of the two components is a cured thermally conductive composition that can provide thermally conductive interface between two surfaces. The mixture of blocked isocyanate prepolymer composition and amine composition may be cured at a temperature from 0° C. to 60° C., 10° C. to 50° C., 15° C. to 45° C., or 18° C. to 35° C. (e.g., RT). Curing may be indicated by increase in the viscosity after mixing A-side and B-side, with the eventual formation of a cured thermally conductive solid with a measurable hardness. The cured thermally conductive composition may have a range of hardness as determined by ASTM D-2240-15 in a range of 40 to 95 Shore 00, 50 to 90 Shore OO, or 60 to 85 Shore OO.

Thermally conductive compositions disclosed herein may cure in less than 14 days, less than 10 days, or less than 7 days, and generally on a time scale greater than 30 minutes. Cured thermally conductive compositions may have a thermal conductivity >0.5 W/m·K, or >1 W/m·K, or most preferably >1.5, W/m·K, or <50 W/m·K. In some embodiments, cured thermally conductive compositions may have a density of 1 gm/cc to 4 gm/cc, 1.5 to 3.5 gm/cc, or 1.8 to 3.1 gm/cc. Additionally, the viscosity of A-side and B-side allows for easy processing of the material.

Thermally conductive compositions disclosed herein may be useful as a gap filler or an adhesive for energy storage devices and in electronic vehicle battery thermal management. In some cases, the compositions can be applied between a heat sink such as a cooling plate and heat source such as a battery module to provide a thermally conductive interface.

Manual or semiautomatic dispensing tools can be used to apply the composition directly to the target surface to minimize waste. In an embodiment, a thermally conductive composition may be prepared by combining a blocked isocyanate prepolymer composition and an amine composition and applying to a cooling plate or heat sink an automated mix-meter-dispense system, followed by installation of a battery cell, module or pack, or other heat source.

Additionally, thermally conductive compositions may be used to form pre-cured articles such as thermal interface gap pads. In one example, pre-cured articles may be formed by curing a thermally conductive compositions at a desired thickness, cutting the article to a desired shape, and then compressed to fix in place as needed. Gap pads prepared by compositions disclosed herein may provide and/or improve thermal interfaces between heat sinks and electronic devices, accommodating for uneven surfaces, air gaps, and rough surface textures. In some cases, cured articles may also help reduce vibration stress for shock dampening.

EXAMPLES

To test the presently disclosed composition and method, various examples were prepared and tested according to formulations and the testing methodology listed below. The Examples herein are meant to illustrate the disclosure and do not to restrict the scope thereof.

Chemicals used for preparing the comparative and sample formulations for the examples are shown in Table 1.

TABLE 1

Chemicals used in Example Formulations

| Component | Description |
|---|---|
| Blocked Isocyanate Prepolymer-1 | TDI-based blocked isocyanate prepolymer prepared from polypropylene oxide (~3 kDa), with 2.7% NCO before blocking with cardanol, viscosity 15,000-30,000 Pa · s |
| Blocked Isocyanate Prepolymer-2 | Prepolymer of TDI and VORANOL ™ 2000 LM, 12% NCO before blocking. Blocked with cardanol. |
| Isocyanate prepolymer | TDI-based prepolymer with 10% NCO with less than 0.1% free TDI |
| Amine-1 | Primary triamine based on polypropylene glycol backbone with a molecular weight of 5000, viscosity ~0.8-0.9 Pa · s |
| Amine-2 | Primary triamine based on polypropylene glycol backbone with molecular weight of 440 |
| Filler-1 | Hydrophobically surface modified aluminum trihydrate (ATH) with a $D_{10}$ of 0.5 microns, $D_{50}$ of 8 microns, and $D_{90}$ of 80 microns. Filler has a broad particle size distribution. |
| Filler-2 | Unmodified ATH with a $D_{10}$ of 0.5 microns, $D_{50}$ of 8 microns and $D_{90}$ of 80 microns without any surface treatment. Filler has a broad particle size distribution. |
| Plasticizer-1 | Methyl ester derivative of Soybean oil |
| Plasticizer-2 | Alkylsulphonic phenyl ester |
| Polyol blend | 4:4:1.2 blend of 2 kDa polypropylene glycol, 4 kDa polypropylene glycol, and 1,4-butanediol |
| Catalyst-1 | Potassium 2-ethylhexanoate |
| Catalyst-2 | Tertiary amine |
| Catalyst-3 | 1,8-Diazabicyclo[5.4.0]undec-7-ene |
| Catalyst-4 | Dibutyl tin dilaurate |
| Molecular sieves | 3 Å Zeolites |
| Blue dye | Organic coloring agent |
| Silane | Hexadecyltrimethoxysilane |
| Dispersion Additive | Hyperbranched polyester |

Preparation

Formulations were prepared by combining individual components and mixing using a high-speed mixer. Side-A and Side-B of the formulation were prepared separately. For curing, the two-part compositions (Side-A and Side-B) were mixed in 1:1 weight ratio (unless otherwise specified) using a high-speed mixer and allowed to cure at room temperature.

Testing Methodology

Hardness was measured using a Shore OO durometer. Squeeze force was measured using a TA.XTplus texture analyzer equipped with a 50 kg load cell. After dispensing the respective sample onto a flat aluminum substrate, an acrylic probe with a diameter of 40 mm was lowered to sandwich the test material against the flat substrate to achieve a standard 5.0 mm gap thickness. Any excess overflow material was trimmed away with a flat-edge spatula. After trimming, the test started and the probe moved to a final thickness of 0.3 mm, at a rate of 1.0 mm/see while the force was recorded. The specific force value recorded at the gap of 0.5 mm is reported as the "squeeze force". Squeeze force values were measured within seven days of preparing the sample.

Sample thermal conductivity was measured per ISO 22007-2 using the Hot Disk Thermal Constants Analyzer (TPS 2500S, Thermtest Instruments, Canada). All measurements were done with a Kapton encased thermal probe using a double-sided measurement with two-6 mm cups, at 150 mW heating power and 5 second measurement time.

Example 1: Room Temperature Curing Thermally Conductive Composition

Thermally conductive compositions and comparative formulations were prepared and the curing properties and resulting hardness were analyzed. Table 2 lists the composition of samples tested and their respective properties, where E samples represent compositions prepared in accordance with the present disclosure, and CE samples represent comparative formulations. Reported values for sample components are provided in grams unless otherwise indicated.

TABLE 2

Sample formulations and results for Example 1

| Sample | E1 | | E2 | | CE1 | |
|---|---|---|---|---|---|---|
| | A-side | B-side | A-side | B-side | A-side | B-side |
| Blocked Isocyanate prepolymer-1 | 6.4 | — | 7.43 | — | — | — |
| Isocyanate prepolymer | — | — | — | — | 10 | — |
| Plasticizer-1 | 7.81 | 5.91 | 7.43 | 5.91 | — | — |
| Plasticizer-2 | — | — | — | — | 5 | — |
| Amine-1 | — | 7.84 | — | 8.87 | — | — |
| Polyol blend | — | — | — | — | — | 15 |
| Catalyst-1 | — | — | — | 0.49 | — | — |
| Catalyst-3 | — | 0.01 | — | — | — | — |
| Filler-1 | 85.5 | 86 | 84.16 | 83.74 | 84.16 | 84.16 |
| Blue dye | 0.04 | | | | | |
| Molecular sieves | 0.25 | 0.25 | 0.99 | 0.99 | 0.99 | 0.99 |
| Appearance | Smooth paste | Smooth paste | Smooth paste | Smooth paste | Solid | Putty |
| Composition Properties | | | | | | |
| Squeeze force [N] | 100 | 121 | 136 | 98 | Could not be performed | — |
| Thermal | 2.15 | 2.22 | 2.06 | 1.97 | — | — |

TABLE 2-continued

Sample formulations and results for Example 1

| Sample | E1 A-side | E1 B-side | E2 A-side | E2 B-side | CE1 A-side | CE1 B-side |
|---|---|---|---|---|---|---|
| Conductivity [W/m · K] | | | | | | |
| 2 day hardness (Shore OO) | — | | 55 | | Could not be performed | |
| 5 day hardness (Shore OO) | 77 | | — | | Could not be performed | |
| 7 day hardness (Shore OO) | 81 | | 85 | | Could not be performed | |
| >14 day hardness (Shore OO) | 81 | | 85 | | Could not be performed | |

Samples E1 and E2 exhibited high thermal conductivity (>1.5 W/m·K), squeeze force of <150 N, and a Shore OO hardness within the range of 60 to 90. Samples E1 and E2 also utilize a low density ATH filler, rendering a final product of low density of estimated ~2.0 gm/cc. In contrast, CE1 included an unblocked isocyanate prepolymer and, when formulated with filler, the A-side quickly thickened into a solid within a day, highlighting the incompatibility of the unblocked prepolymer with reactive groups on the filler, and was unusable as an acceptable gap filler.

Example 2: Catalyst Effects on Cure Time

Several catalysts were evaluated to study their effect on the curing properties of the thermally conductive compositions. A-side composition shown in Table 3 was cured with B-side compositions for E3-E6. Catalyst-1, Catalyst-2 and Catalyst-3 were found to accelerate the curing reaction significantly, where Catalyst-3 could induce complete curing in 1 day at low catalyst loadings. CE2 using Catalyst-4 had much lower cure hardness at day 1, showing the benefit of specific catalysts disclosed here.

Example 3: Use of Plasticizer to Control Squeeze Force

Examples below show that very low squeeze force (<60 N) is achievable with the described compositions. Additionally, the heat aging of the formulation at 60° C. for 2 weeks results in less than 25% increase in squeeze force, showing that the compositions are stable.

TABLE 4

Sample formulations and results for Example 3

| Sample | E7 A-side | E7 B-side |
|---|---|---|
| Blocked Isocyanate prepolymer-1 | 5.38 | 0 |
| Amine-1 | 0 | 6.25 |
| Plasticizer-1 | 8.97 | 7.83 |
| Catalyst-3 | 0 | 0.01 |
| Filler-1 | 85.46 | 85.91 |
| Blue dye | 0.2 | 0 |
| Composition Properties | | |
| Squeeze force [N] | 53 | 56 |
| Squeeze force [N]/2 week at 60° C. | 63 | 58 |

TABLE 3

Sample formulations and results for Example 2

| Sample | A-Side | E3 B-side | E4 B-side | E5 B-side | E6 B-side | CE2 B-side |
|---|---|---|---|---|---|---|
| Blocked Isocyanate Prepolymer-1 | 10.4 | — | — | — | — | — |
| Amine-1 | — | 12.55 | 12.55 | 12.55 | 12.66 | 12.55 |
| Plasticizer-1 | 4.46 | 2.16 | 2.16 | 2.16 | 2.18 | 2.16 |
| Catalyst-1 | — | 0.98 | — | — | — | — |
| Catalyst-2 | — | — | 0.98 | — | — | — |
| Catalyst-3 | — | — | — | 0.98 | 0.12 | — |
| Catalyst-4 | — | — | — | — | — | 0.98 |
| Filler-1 | 84.16 | 83.33 | 83.33 | 83.33 | 84.06 | 83.33 |
| Molecular sieves | 0.99 | 0.98 | 0.98 | 0.98 | 0.99 | 0.98 |
| Combined Composition Properties | | | | | | |
| 1 day hardness (Shore OO) | — | 65 | 85 | 65* | 85 | 20-30 |
| 7 day hardness (Shore OO) | — | 85 | 85 | 65 | 85 | — |
| >14 day hardness (Shore OO) | — | 85 | 85 | 65 | 85 | — |

*E5 cured immediately after mixing.

TABLE 4-continued

Sample formulations and results for Example 3

| Sample | E7 A-side | E7 B-side |
|---|---|---|
| Thermal Conductivity [W/m · K] | 2.136 | 2.323 |

Example 4: Effect of Dispersion Additive

In this example, a sample containing a dispersion additive to reduce the squeeze force of a B-side composition was analyzed with a comparative sample from which the dispersion additive was omitted. Samples were prepared in a Ross double planetary mixer. The results indicate that CE3 exhibited a high squeeze force (>200 N), while the B-side composition was also a poorly workable dry solid. In contrast, the B-side of E8 remained a workable paste with a lower squeeze force (<150N).

TABLE 5

Sample formulations and results for Example 4

| Sample | CE3 A-side | CE3 B-side | E8 A-side | E8 B-side |
|---|---|---|---|---|
| Blocked Isocyanate Prepolymer-1 | 2.5 | — | 2.5 | — |
| Amine-2 | — | 0.60 | — | 0.60 |
| Plasticizer-1 | 6.7 | 8.16 | 6.7 | 7.66 |
| Catalyst-3 | — | 0.02 | — | 0.02 |
| Blue dye | 0.05 | — | 0.05 | — |
| Filler-1 | 90.75 | 91.23 | 90.75 | 91.23 |
| Dispersion Additive | — | — | — | 0.5 |
| Composition Properties | | | | |
| Appearance | Smooth paste | Dry paste | Smooth paste | Smooth paste |
| Squeeze force [N] | 135 | 203 | 135 | 131 |
| Thermal Conductivity [W/m · K] | 2.989 | 3.08 | 2.989 | 3.097 |
| Hardness-Shore 00 | — | | 65 | |

Example 5: Filler Surface Modification

In this example, thermally conductive compositions were prepared to study the effect of filler surface modification on the resulting viscosity and squeeze force of the A-side and B-side components and their respective shelf stability. For the evaluation of shelf stability, sample were loaded into glass vials, nitrogen padded and taped and kept in an oven at 60° C. Squeeze force was measured after cooling the sample to room temperature after one week aging at 60° C.

CE4 and CE5 have a filler with broad particle size without surface treatment and with an added silane treatment agent. Squeeze force of B-side for both samples increased significantly after aging at 60° C. for one week. The B-side for samples CE4 and CE5 also had a hard appearance after 7 days storage at room temperature and needed to be heated to 60 to become a paste E9 and E10 have a pretreated filler with broad particle size and hydrophobic surface treatment. No significant increase was found in squeeze force of the B-side after aging at 60° C. for one week. B-side also remained a paste without any heating needed. As demonstrated, E9 and E10 produced cured thermally conductive compositions with hardness of 73 and 71 Shore OO, respectively.

TABLE 6A

Sample formulations and results for Example 5

| Sample | CE4 A-side | CE4 B-side | E9 A-side | E9 B-side |
|---|---|---|---|---|
| Blocked isocyanate Prepolymer-2 | 16 | 0 | 16 | 0 |
| Amine-2 | 0 | 19.6 | 0 | 19.6 |
| Plasticizer-1 | 14.13 | 9.76 | 19.13 | 14.76 |
| Catalyst-3 | 0 | 0.0125 | 0 | 0.0125 |
| Blue dye | 0.5 | 0 | 0.5 | 0 |
| Silane | 5 | 5 | — | — |
| Filler-1 (surface treated) | — | — | 214.38 | 215.63 |
| Filler-2 (untreated) | 214.38 | 215.63 | — | — |
| Composition Properties | | | | |
| Appearance after 1 week | Soft paste | Solid-Required heating at 60° C. to mix | Soft paste | Soft paste |
| Squeeze force [N] | 93 | 98 | 103 | 99 |
| Squeeze force after 60° C. for 1 wk [N] | 101 | 175 | 99 | 92 |
| Thermal Conductivity [W/m · K] | 2.139 | 2.128 | 2.096 | 2.136 |
| Hardness-Shore 00 | 72 | | 73 | |

TABLE 6B

Sample formulations and results for Example 5

| Sample | CE5 A-side | CE5 B-side | E10 A-side | E10 B-side |
|---|---|---|---|---|
| Blocked isocyanate prepolymer-2 | 5 | — | 5 | — |
| Amine-1 | — | 1.19 | — | 1.19 |
| Plasticizer-1 | 9.4 | 11.91 | 13.4 | 15.81 |
| Catalyst-3 | — | 0.04 | — | 0.04 |
| Dispersion Additive | — | 0.4 | — | 0.5 |
| Blue dye | 0.1 | — | 0.1 | — |
| Filler-1 (surface treated) | — | — | 181.5 | 182.46 |
| Filler-2 (untreated) | 181.5 | 182.46 | — | — |
| Silane | 4 | 4 | — | — |
| Composition Properties | | | | |
| Squeeze force [N] | 158 | 97 | 115 | 97 |
| Appearance | Soft paste | Soft paste | Soft paste | Soft paste |
| Appearance after 1 wk | Soft paste | Solid-Required heating at 60° C. to mix | Soft paste | Soft paste |
| Squeeze force at 60° C. after 1 wk [N] | 197 | >500 | 139 | 88 |
| Thermal Conductivity [W/m · K] | 2.986 | 3.218 | 2.914 | 2.924 |
| Hardness-Shore OO | 80 | | 71 | |

While the foregoing is directed to exemplary embodiments, other and further embodiments may be devised without departing from the basic scope thereof, and the scope thereof is determined by the claims that follow.

The invention claimed is:

1. A thermally conductive composition, comprising:
    a blocked isocyanate prepolymer composition comprising an isocyanate prepolymer blocked with one or more of alkylphenol or alkenylphenol; and
    an amine composition comprising:
        one or more polyetheramines, and
        one or more catalysts selected from a group consisting of carboxylate salts, tertiary amines, amidines, guanidines, and diazabicyclo compounds; and
    a thermally conductive filler present at a percent by weight of the thermally conductive composition (wt %) in a range of 60 wt % to 98 wt %;
    wherein the thermally conductive composition cures at a temperature in the range of 18° C. to 35° C. when the blocked isocyanate prepolymer composition and the amine composition are mixed.

2. The composition of claim 1, wherein the amine composition comprises one or more polyether amines with a molecular weight of 300 to 7000 Da and an average amine functionality greater than 2.

3. The composition of claim 1, wherein the thermally conductive filler is modified with a treatment agent prior to combination with the thermally conductive composition, the treatment agent comprising one or more selected from a group consisting of fatty acids, silane treating agents, titanates, zirconates, aluminates, and silazane compounds.

4. The composition of claim 1, wherein the thermally conductive filler is pretreated with a C5 to C20 alkylsilane.

5. The composition of claim 1, wherein the blocked isocyanate prepolymer is present at a percent by weight of the thermally conductive composition (wt %) in a range of 1 wt % to 15 wt %.

6. The composition of claim 1, further comprising a hyperbranched polyester dispersion additive in the amine composition.

7. The composition of claim 1, wherein the thermally conductive filler comprises a mixture of aluminum trihydrate (ATH) fillers having a bimodal particle size distribution produced by blending one filler having $D_{50}$ in the range of 0.1 to 20 μm and second filler having $D_{50}$ in the range of 10 to 200 μm.

8. The composition of claim 1, wherein the blocked isocyanate prepolymer composition and the amine composition each have a squeeze force, as determined by compression using a probe having a diameter of 40 mm lowered at a rate of 1.0 mm/see to a gap of 0.5 mm, of 250 N or less.

9. A thermally conductive gap filler prepared by combining the blocked isocyanate prepolymer composition and the amine composition, and curing the resulting thermally conductive composition of claim 1.

10. A method of using the thermally conductive composition of any claim 1, the method comprising combining the blocked isocyanate prepolymer composition and the amine composition; and emplacing the thermally conductive composition between a heat source and a heat sink in an EV battery.

* * * * *